United States Patent
Nagatsuka et al.

(10) Patent No.: US 9,682,475 B2
(45) Date of Patent: Jun. 20, 2017

(54) ROBOT PROGRAM MODIFICATION SYSTEM

(71) Applicant: FANUC Corporation, Yamanashi (JP)

(72) Inventors: Yoshiharu Nagatsuka, Yamanashi (JP); Yanxue Liang, Yamanashi (JP); Norio Takei, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/794,396

(22) Filed: Jul. 8, 2015

(65) Prior Publication Data

US 2016/0008976 A1    Jan. 14, 2016

(30) Foreign Application Priority Data

Jul. 9, 2014 (JP) ................... 2014-141586

(51) Int. Cl.
*B25J 9/16* (2006.01)
*G05B 13/04* (2006.01)

(52) U.S. Cl.
CPC ..... *B25J 9/163* (2013.01); *G05B 2219/40387* (2013.01); *G05B 2219/40515* (2013.01)

(58) Field of Classification Search
CPC ........... B25J 9/163; G05B 2219/40371; G05B 2219/40515; G05B 13/04–13/048
See application file for complete search history.

(56) References Cited

U.S. PATENT DOCUMENTS

| 5,047,700 A * | 9/1991 | Szakaly ............... G05B 19/427 318/568.1 |
| 6,332,101 B1 | 12/2001 | Kaneko et al. |
| 2005/0049749 A1* | 3/2005 | Watanabe ............. B25J 9/1671 700/245 |
| 2007/0021868 A1* | 1/2007 | Nagatsuka ............ B25J 9/1674 700/245 |

(Continued)

FOREIGN PATENT DOCUMENTS

| CN | 1903523 B | 11/2010 |
| DE | 102011011542 A1 | 8/2012 |

(Continued)

OTHER PUBLICATIONS

Xiaolin Hu, "Applying robot-in-the-loop-simulation to mobile robot systems," ICAR '05. Proceedings., 12th International Conference on Advanced Robotics, 2005., Seattle, WA, 2005, pp. 506-513.*

*Primary Examiner* — Adam Mott
(74) *Attorney, Agent, or Firm* — Hauptman Ham, LLP

(57) ABSTRACT

A robot program modification system comprises a robot control apparatus and a program modification apparatus. The robot control apparatus has an information acquisition unit which executes an operation program and acquires robot detection information from a robot, and a communication unit which transmits the robot detection information to the program modification apparatus. The program modification apparatus has a simulation unit which performs simulation on the basis of the operation program, and a program modification unit which modifies the operation program on the basis of the robot detection information so that a result of the simulation satisfies an evaluation basis decided in advance.

6 Claims, 8 Drawing Sheets

(56) References Cited

U.S. PATENT DOCUMENTS

| | | |
|---|---|---|
| 2010/0017026 A1 | 1/2010 | Fletcher et al. |
| 2012/0215352 A1* | 8/2012 | Eberst .................. B25J 9/1664 |
| | | 700/253 |
| 2013/0245792 A1* | 9/2013 | Anzai ................ G05B 19/0426 |
| | | 700/79 |

FOREIGN PATENT DOCUMENTS

| | | |
|---|---|---|
| DE | 112011104865 T5 | 11/2013 |
| EP | 1921526 B1 | 2/2012 |
| JP | 63-94307 A | 4/1988 |
| JP | 64-79807 A | 3/1989 |
| JP | 11-33960 A | 2/1999 |
| JP | 2001-100834 A | 4/2001 |
| JP | 2004-348250 A | 12/2004 |
| JP | 2007-054942 A | 3/2007 |
| JP | 2007-136671 A | 6/2007 |
| JP | 2009-119589 A | 6/2009 |
| JP | 2009-274180 A | 11/2009 |

\* cited by examiner

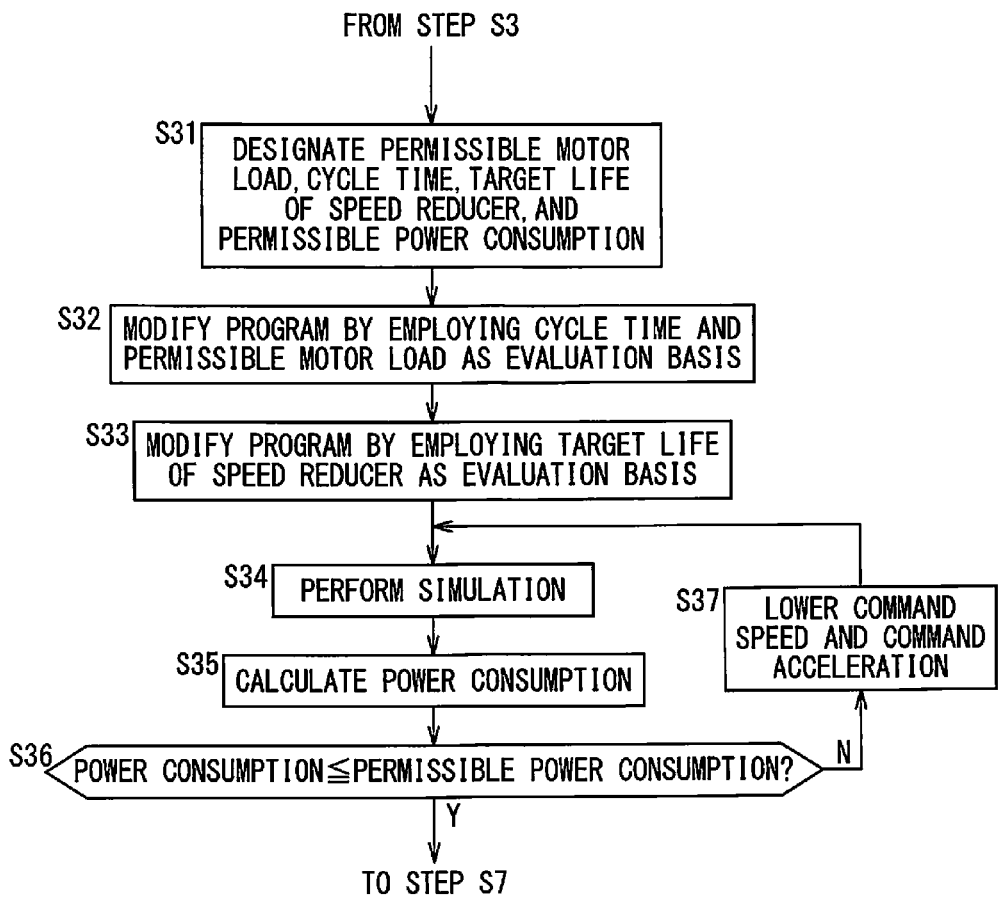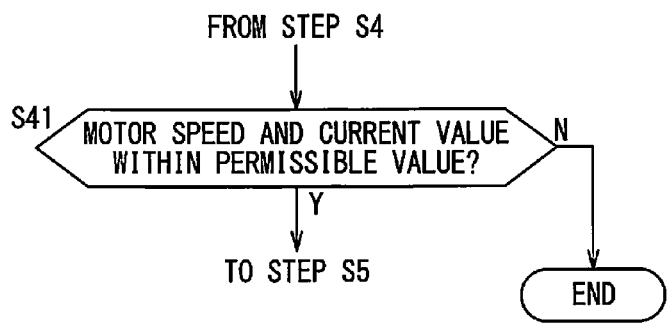

ROBOT PROGRAM MODIFICATION SYSTEM

RELATED APPLICATIONS

The present application claims priority to Japanese Application Number 2014-141586, filed Jul. 9, 2014, the disclosure of which is hereby incorporated by reference herein in its entirety.

BACKGROUND OF THE INVENTION

1. Field of the Invention

The present invention relates to a robot program modification system which modifies an operation program of a robot.

2. Description of the Related Art

Conventionally, as an apparatus for modifying a robot program, there has been known an apparatus configured to modify a command speed and a command acceleration in relation to a servo motor so that a cycle time of a robot is minimized within a permissible range of a load of the servo motor (for example, Japanese Laid-open Patent Publication No. 2007-54942). The apparatus disclosed in Japanese Laid-open Patent Publication No. 2007-54942 modifies an operation program which has been created offline, performs simulation on the basis of the operation program of the robot to calculate load torque of the servo motor, and modifies a command speed and a command acceleration of the program on the basis of the load torque.

However, since the apparatus disclosed in Japanese Laid-open Patent Publication No. 2007-54942 performs the simulation offline, it is not possible to accurately perform judgment and the like of a motor load, and therefore it is difficult to accurately modify the program.

SUMMARY OF INVENTION

A robot program modification system according to one aspect of the present invention includes a robot control apparatus which controls a motor for robot driving and a program modification apparatus which communicates with the robot control apparatus. The robot control apparatus has an information acquisition unit which executes an operation program including a command speed and a command acceleration at a teaching point of a robot and acquires robot detection information including a speed and a current value of the motor from the robot, and a first communication unit which transmits the robot detection information acquired in the information acquisition unit to the program modification apparatus. The program modification apparatus has a simulation unit which performs simulation on the basis of the operation program by using the robot detection information transmitted by the first communication unit, and a program modification unit which modifies the operation program so that a predetermined evaluation parameter satisfies an evaluation basis decided in advance while the simulation unit repeatedly performs the simulation. The program modification apparatus has a second communication unit which transmits a modified operation program modified by the program modification unit to the robot control apparatus.

BRIEF DESCRIPTION OF THE DRAWINGS

The object, features, and advantages of the present invention will be further apparent from a description of the following embodiment associated with the accompanying drawings, and in the accompanying drawings:

FIG. 6 is a flowchart illustrating a further example of variation of FIG. 4;

FIG. 7 is a flowchart illustrating an example of variation of FIG. 3;

DETAILED DESCRIPTION

Figure 1:
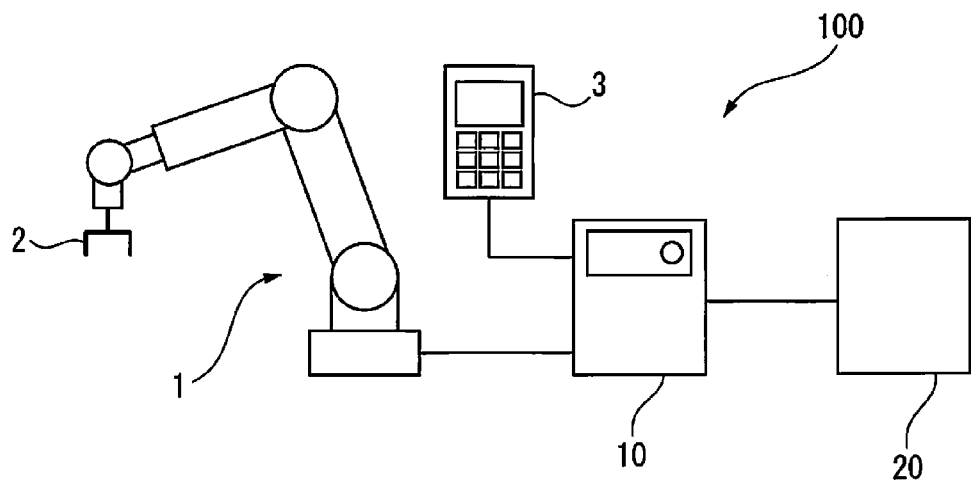
FIG. 1 is a diagram illustrating a schematic configuration of a robot program modification system according to an embodiment of the present invention.

Hereinafter, with reference to FIG. 1 to FIG. 13, an embodiment of the present invention will be described. FIG. 1 is a diagram illustrating a schematic configuration of a robot program modification system 100 according to an embodiment of the present invention. The robot program modification system 100 includes a robot control apparatus 10 which controls a robot 1 according to an operation program PR, and a program modification apparatus 20 which communicates with the robot control apparatus 10 and modifies the operation program PR.

The robot 1 illustrated in FIG. 1 is an articulated industrial robot, is provided at a front end portion of an arm thereof with a grasping unit 2, and can grasp a work piece by using the grasping unit 2 and convey the work piece. The robot 1 has a plurality of driving axes and each driving axis is driven by a servo motor (each axis motor). A teaching operation panel 3 is connected to the robot control apparatus 10 and a user can teach an operation of the robot 1 by operation of the teaching operation panel 3.

In the present embodiment, the program modification apparatus 20 acquires the operation program PR from the robot control apparatus 10, and performs simulation on the basis of the operation program PR. Moreover, the operation program PR is modified based on the robot detection information on a speed, a current value and the like of the servo motor acquired from the robot control apparatus 10. In other words, the robot 1 is operated actually and the operation program PR is modified online other than offline.

Figure 2:
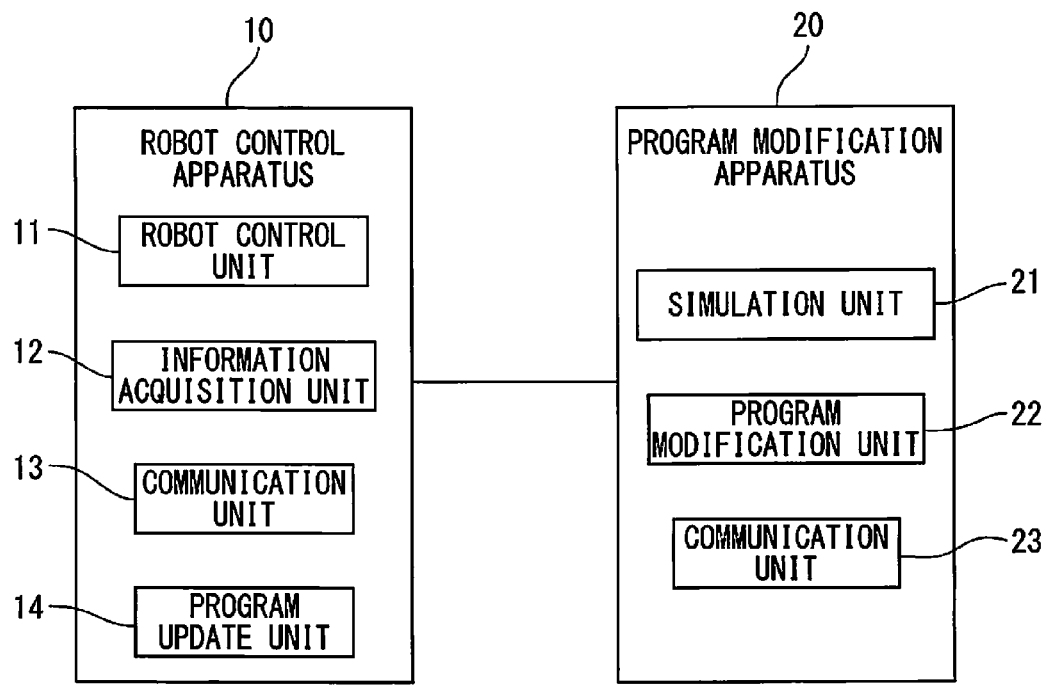
FIG. 2 is a block diagram illustrating a configuration of a robot control apparatus and a program modification apparatus of FIG. 1.

FIG. 2 is a block diagram illustrating a configuration of the robot control apparatus 10 and the program modification apparatus 20 of FIG. 1. Each of the robot control apparatus 10 and the program modification apparatus has a computer including an operation processing device having CPU (Central Processing Unit), ROM (Read Only Memory), RAM (Random Access Memory), other peripheral circuits and the like. The robot control apparatus 10 has a robot control unit 11, an information acquisition unit 12, a communication unit 13 serving as a first communication unit, and a program update unit 14 as a functional configuration. The program modification apparatus 20 has a simulation unit 21, a program modification unit 22, and a communication unit 23 serving as a second communication unit as a functional configuration.

The robot control unit 11 outputs a control signal to the servo motor according to the operation program PR stored in advance, and controls the movement of the robot 1. The operation program PR includes a command speed and a command acceleration at a teaching point taught by the teaching operation panel 3.

The information acquisition unit 12 acquires robot detection information on the basis of signals from various detectors provided in the robot 1, the control signal output from the robot control unit 11, and the like. The robot detection information includes a physical quantity indicating the operation state of the robot 1, which changes according to the operation of the robot 1. As one example, the robot detection information includes a speed and a current value of each axis motor. The motor speed, for example, is obtained by a signal from a rotary encoder provided in each servo motor. The current value, for example, is obtained by detecting a current supplied from a servo amplifier to the servo motor by using an ammeter. The robot detection information acquired by the information acquisition unit 12 is stored in a storage unit of the robot control apparatus 10 once.

The communication unit 13 has a transmission unit which transmits a signal to the program modification apparatus 20, and a reception unit which receives a signal from the program modification apparatus 20. The robot control apparatus 10 and the program modification apparatus 20 are connected to each other via the communication units 13 and 23 in a wired manner. In addition, the apparatuses can be connected to each other in a wireless manner. The robot detection information acquired by the information acquisition unit 12 and stored in the storage unit is transmitted from the communication unit 13 (a transmission unit) to the program modification apparatus 20. In addition, the robot detection information acquired by the information acquisition unit 12 can also be directly transmitted via the communication unit 13 without being stored in the storage unit. Moreover, the communication unit 13 transmits robot configuration information of the operation program PR and the like to the program modification apparatus 20. The robot configuration information is robot-specific information including variables indicating the state of the robot 1 and various parameters, in addition to the operation program PR.

The communication unit 13 also transmits various types of information used for the modification of the operation program PR to the program modification apparatus 20. The information includes an evaluation basis serving as a basis of the modification of the operation program PR and the evaluation basis can be input by a user via the teaching operation panel 3. The evaluation basis can be decided by parameters such as a cycle time of the operation program PR, temperature, an average current, a maximum current, a maximum speed, and power consumption of each axis motor, the life of a speed reducer connected to the servo motor, and the like. A user selects one or more of these parameters and designates the evaluation basis for the purpose of program modification. For example, a permissible time of the cycle time, a permissible value of the motor temperature, a target life of the speed reducer, a permissible value of the power consumption, and the like are designated as the evaluation basis. Maximally shortening the cycle time can be designated as the evaluation basis. The evaluation basis to be used for the program modification can be set in advance in the robot control apparatus 10 or the program modification apparatus 20 without the designation of a user.

The program update unit 14 receives a modified operation program PR1 from the program modification apparatus 20 via the communication unit 13, and updates the operation program PR. The permission or prohibition of the program update process in the program update unit 14 can be commanded by a user through the operation of the teaching operation panel 3.

The simulation unit 21 performs simulation on the basis of the operation program PR transmitted from the communication unit 13 of the robot control apparatus 10. The simulation is performed using the robot configuration information transmitted by the communication unit 13. By the simulation, operation information of each element of the robot 1, i.e., a position, a speed, and an acceleration of each element of the robot 1 which correspond to each program line, load, power consumption of the servo motor, cycle time and the like. In addition, the simulation result can be displayed on a display unit provided in the program modification apparatus 20.

The program modification unit 22 modifies the operation program PR on the basis of the robot detection information (the speed, the current value and the like of each axis motor) so that a result of repeated simulation by the simulation unit 21 satisfies the evaluation basis designated in the robot control apparatus 10. For example, when the cycle time is designated as the evaluation basis, the program modification unit 22 modifies the command speed and the command acceleration at the teaching point of the operation program PR using the speed, the current value and the like of each axis motor obtained from the robot control apparatus 10 so that the cycle time becomes shortest.

The communication unit 23 has a transmission unit which transmits a signal to the robot control apparatus 10, and a reception unit which receives a signal from the robot control apparatus 10. An operation program (the modified operation program PR1) modified by the program modification unit 22 is transmitted from the communication unit 23 (a transmission unit) to the program modification apparatus 20. In addition, the modified operation program PR1 may be stored in a storage unit of the program modification apparatus 20 once, and then the stored modified operation program PR1 may be transmitted via the communication unit 23. Only the modification parts of the operation program PR may also be transmitted to the robot control apparatus 10. In this case, it is sufficient that the robot control apparatus (the program update unit 14) updates the operation program PR by modifying a part of the operation program PR.

Figure 3:
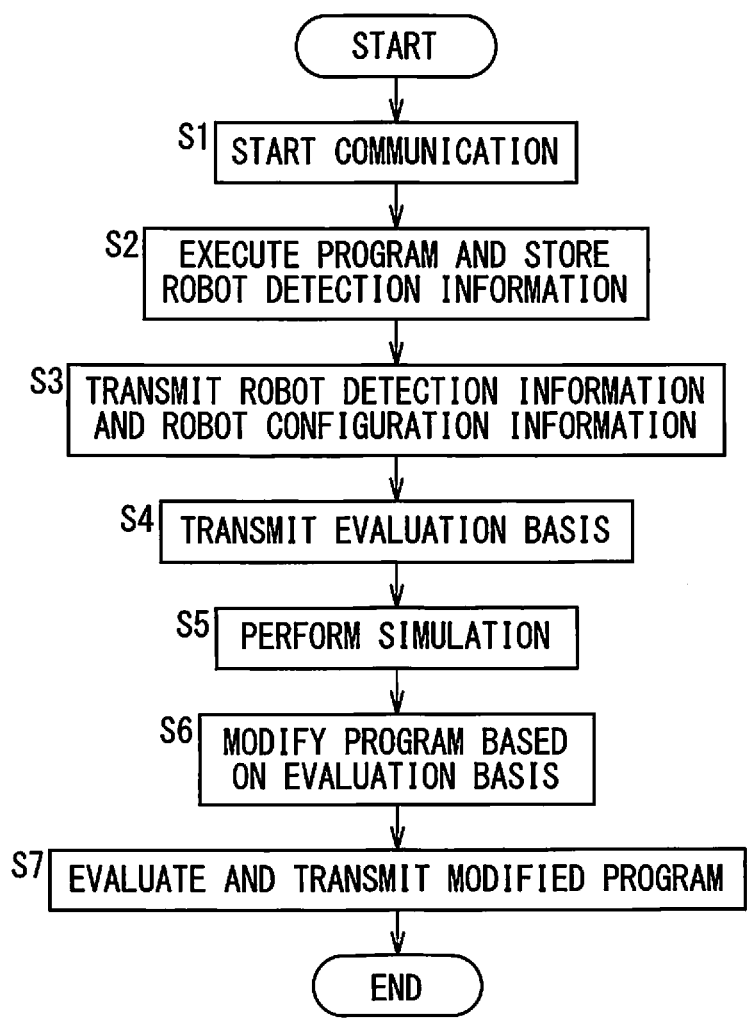
FIG. 3 is a flowchart illustrating one example of a procedure performed in the robot control apparatus and the program modification apparatus of FIG. 1.

FIG. 3 is a flowchart illustrating one example of a procedure performed in the robot control apparatus 10 and the program modification apparatus 20. The process indicated by the flowchart, for example, is started when a program modification command is input by the teaching operation panel 3. In step S1, the robot control apparatus 10 and the program modification apparatus 20 start to communicate with each other.

In step S2, the robot control unit 11 outputs a control signal to the servo motor according to the operation program PR decided in advance (executes a program), and the information acquisition unit 12 acquires the robot detection information (the speed and the current value of each axis motor) at every predetermined time, and the acquired robot detection information is stored in the storage unit in time series.

In step S3, the robot detection information stored in step S2 and the robot configuration information (the operation program PR and the like) stored in advance are transmitted to the program modification apparatus 20 via the communication unit 13.

In step S4, an evaluation basis input in advance via the teaching operation panel 3 is read and the evaluation basis is transmitted to the program modification apparatus 20 via the communication unit 13.

In step S5, on the basis of the robot configuration information (the operation program PR and the like) transmitted from the robot control apparatus 10 in step S3, the simulation unit 21 of the program modification apparatus 20 repeatedly performs simulation.

In step S6, on the basis of the evaluation basis transmitted from the robot control apparatus 10 in step S4, the program modification unit 22 of the program modification apparatus 20 modifies the operation program PR. In other words, the operation program PR is modified so that the result of the simulation of step S5 satisfies the evaluation basis.

In step S7, the propriety of the modified operation program PR1 modified in step S6 is evaluated and an evaluation result is transmitted to the robot control apparatus 10 via the communication unit. Then, the robot control apparatus 10 updates the operation program PR to the modified operation program PR1.

Figure 4:
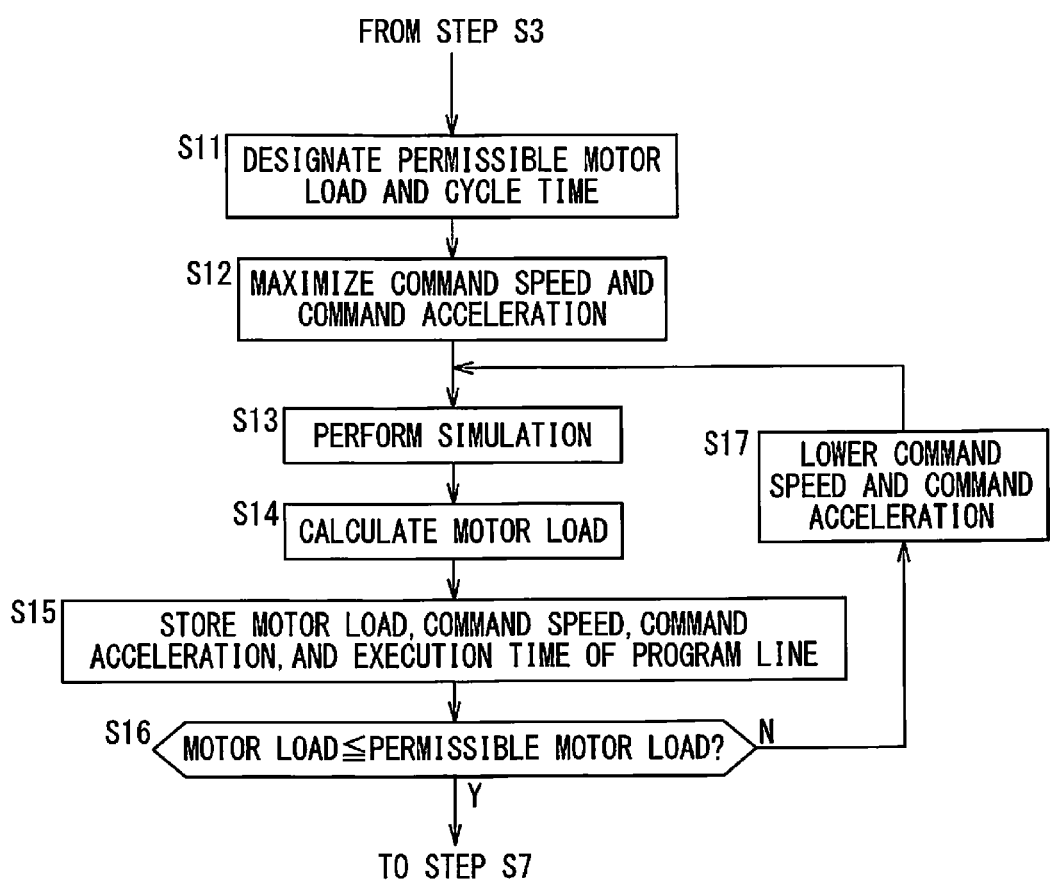
FIG. 4 is a flowchart illustrating in detail a part of a procedure of FIG. 3.

FIG. 4 is one example of a flowchart illustrating in detail the processes of step S4 to step S6 of FIG. 3, and illustrates an example in which the permissible load (a permissible motor load) of the servo motor and the cycle time have been designated as the evaluation basis. In addition, the designation of the cycle time indicates that maximally shortening the cycle time has been designated as the evaluation basis. When the process of step S3 of FIG. 3 is ended, the procedure proceeds to step S11 of FIG. 4. In step S11, the evaluation basis input in advance via the teaching operation panel 3, i.e. the permissible motor load and the cycle time are transmitted to the program modification apparatus 20.

In step S12, in order to maximally shorten the cycle time, the command speed and the command acceleration of the operation program PR are changed to a maximum value. In step S13, simulation is performed on the basis of the operation program PR. In step S14, a load of each axis motor at every predetermined time is calculated. The motor load is calculated by the robot detection information transmitted from the robot control apparatus 10, i.e., by a well-known arithmetic equation using the speed and the current value of each axis motor. In step S15, the load of each axis motor calculated in step S14 is correlated with the command speed and the command acceleration of the operation program PR and an execution time of each program line, and the correlation result is stored in the storage unit of the program modification apparatus 20 in time series. In addition, the processes from step S12 to step S15 are performed by the simulation unit 21.

In step S16, it is judged if the load of each axis motor stored in step S14 is within the permissible motor load or not. When step S16 is negative, the procedure proceeds to step S17. In step S17, with respect to the operation in which the motor load has been judged to be out of the permissible range, the command speed and the command acceleration are lowered by a predetermined amount and the procedure returns to step S13. In this way, the motor load calculated by the simulation is reduced. The processes of step S13 to step S17 are repeated through the modification of the operation program PR until the motor load is within the permissible load. When step S16 is positive, the procedure proceeds to step S7 of FIG. 3. In addition, the processes of step S16 and step S17 are performed by the program modification unit 22.

Figure 5:
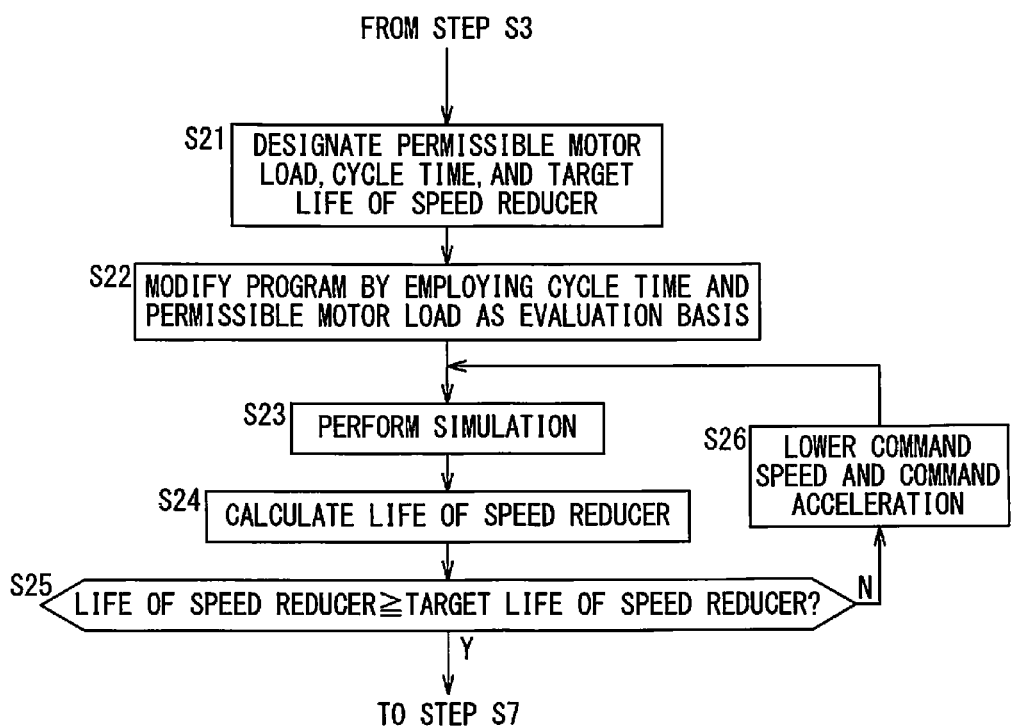
FIG. 5 is a flowchart illustrating an example of variation of FIG. 4.

FIG. 5 is a diagram illustrating an example of variation of FIG. 4. In FIG. 5, a target life of the speed reducer is added as the evaluation basis. In step S21, the permissible motor load, the cycle time, and the target life of the speed reducer, which are the evaluation basis input in advance via the teaching operation panel 3, are transmitted to the program modification apparatus 20. The life of the speed reducer is based on a physical quantity of the speed, acceleration, torque, average torque and the like of the motor. Consequently, the target life of the speed reducer can be indicated by one or more of these physical quantities. In step S22, the operation program PR is modified by employing the cycle time and the permissible motor load as the evaluation basis. In other words, a process similar to the processes from step S12 to step S17 of FIG. 4 is performed so that the operation program PR is modified.

In step S23, simulation is performed using the operation program modified in step S22. In step S24, the life of the speed reducer is calculated using the robot detection information transmitted from the robot control apparatus 10. In this case, the life of the speed reducer is indicated by the same physical quantity as that indicating the target life of step S21. In step S25, it is judged if the life of the speed reducer calculated in step S24 is equal to or more than the target life of step S21 or not. When step S25 is negative, the procedure proceeds to step S26. When step S25 is positive, the procedure proceeds to step S7 of FIG. 3. In step S26, with respect to an operation with a large load, the command speed and the command acceleration are lowered by a predetermined amount and the procedure returns to step S23. By adopting this configuration, the life of the speed reducer is the target life and it is also possible to shorten the cycle time.

FIG. 6 is a diagram illustrating an example of variation of FIG. 5. In FIG. 6, a permissible value of the power consumption (permissible power consumption) is added as the evaluation basis. In step S31, the permissible motor load, the cycle time, the target life of the speed reducer, and the permissible power consumption, which are the evaluation basis input in advance via the teaching operation panel 3, are transmitted to the program modification apparatus 20. The permissible power consumption has a correlation relation with a physical quantity of the speed, acceleration, current value and the like of the motor. Consequently, the permissible power consumption can be indicated by one or more of these physical quantities. In step S32, similarly to step S22 of FIG. 5, the operation program PR is modified by employing the cycle time and the permissible motor load as the evaluation basis. In step S33, the operation program PR is modified by further employing the target life of the speed reducer as the evaluation basis. In other words, a process similar to the processes from step S23 to step S26 of FIG. 5 is performed and the operation program PR is modified.

In step S34, simulation is performed using the operation program modified in step S33. In step S35, the power consumption is calculated using the robot information transmitted from the robot control apparatus 10. In this case, the power consumption is indicated by the same physical quantity as that indicating the permissible power consumption of step S31. In step S36, it is judged if the power consumption calculated in step S35 is equal to or less than the permissible power consumption of step S31 or not. When step S36 is negative, the procedure proceeds to step S37. When step S36 is positive, the procedure proceeds to step S7 of FIG. 3. In step S37, with respect to an operation with a large load, the command speed and the command acceleration are lowered by a predetermined amount and the procedure returns to step S34. In this way, the power consumption is suppressed to be equal to or less than the permissible power consumption while it is possible to shorten the cycle time.

According to the aforementioned embodiments, the robot control apparatus 10 has the information acquisition unit 12 which executes the operation program PR including the command speed and the command acceleration at the teaching point and acquires the robot detection information including the speed and the current value of the motor, and the communication unit 13 which transmits the robot detection information acquired by the information acquisition unit 12 to the program modification apparatus 20. The program modification apparatus 20 has the simulation unit 21 which performs simulation on the basis of the operation program PR, and the program modification unit 22 which modifies the operation program PR on the basis of the robot detection information transmitted by the communication unit 13 so that a result of simulation satisfies an evaluation basis (for example, the cycle time becomes shortest) decided in advance while the simulation unit repeatedly performs the simulation. The program modification apparatus 20 further has the communication unit 23 which transmits the modified operation program PR1 to the robot control apparatus 10. As described above, the operation program PR is modified using the robot information obtained by actually operating the robot 1, and therefore it is possible to accurately judge the motor load and the like and accurately modify the operation program PR.

Furthermore, the program modification apparatus 20 acquires the operation program PR from the robot control apparatus 10 via the communication units 13 and 23, and the simulation unit 21 performs simulation on the basis of the acquired operation program PR. Consequently, the program modification apparatus 20 can be applied to various types of robot control apparatuses 10 having different robot configuration information (the operation programs PR) and has versatility. In addition, the robot configuration information of the operation program PR and the like may also be stored in both the robot control apparatus 10 and the program modification apparatus 20. By adopting this configuration, a process for transmitting the robot configuration information from the robot control apparatus 10 is not necessary.

Moreover, in the present embodiment, instead of the robot control apparatus 10, the program modification apparatus 20 connected to the robot control apparatus 10 modifies the operation program PR by repeatedly executing the operation program PR, so it is possible to shorten the time necessary for modifying the operation program PR. In the program modification, since it is not necessary to stop the operation of the robot 1 being operated, it is possible to prevent an adverse influence on productivity due to the operation of the robot 1.

In addition, the aforementioned robot program modification system 100 can be changed as follows. FIG. 7 is a diagram illustrating an example of variation of FIG. 3. In the example of variation of FIG. 7, under the condition that the speed and the current value of each axis motor included in the robot detection information transmitted from the robot control apparatus 10 are within a permissible value decided in advance, the simulation unit 21 performs simulation. The process of step S41 of FIG. 7, for example, is performed after the process of step S4 of FIG. 3.

In step S41, it is judged if the speed and the current value of each axis motor are within the permissible value decided in advance or not. When step S41 is positive, the procedure proceeds to step S5 of FIG. 3, and when step S41 is negative, the procedure is ended. In other words, when the speed and the current value of each axis motor exceed the permissible value, even though the operation program PR is modified using the robot detection information, a good modification operation program is not obtained. Consequently, in this case, the procedure is ended without performing any simulation in order to prevent the simulation by the simulation unit 21 from being invalid.

Figure 8:
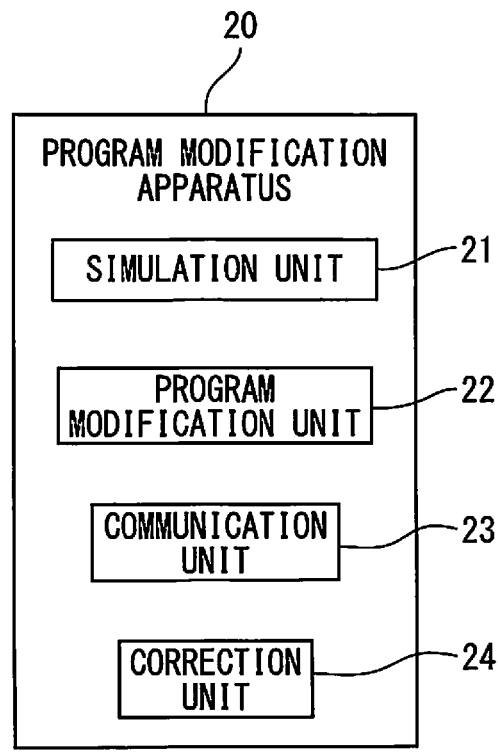
FIG. 8 is a block diagram illustrating an example of variation of the program modification apparatus of FIG. 2.
Figure 9:
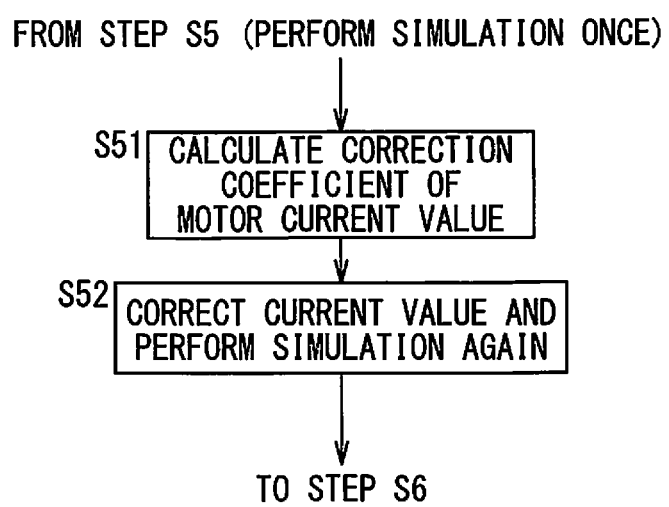
FIG. 9 is a flowchart illustrating one example of a procedure performed in the program modification apparatus of FIG. 8.

FIG. 8 is a block diagram illustrating an example of variation of the program modification apparatus 20 and FIG. 9 is a flowchart illustrating one example of a procedure performed in the program modification apparatus 20. In addition, FIG. 9 mainly illustrates differences with FIG. 3. The program modification apparatus 20 of FIG. 8 further has a correction unit 24 which corrects the current value of the motor calculated by the simulation unit 21 on the basis of the current value of the motor included in the robot detection information transmitted from the robot control apparatus 10. The program modification unit 22 modifies the operation program PR on the basis of the corrected current value.

A process of step S51 of FIG. 9, for example, is performed after simulation is performed once on the basis of the robot configuration information (the operation program PR and the like) in step S5 of FIG. 3. In step S51, the correction unit 24 compares the current value (a first current value) of each axis motor transmitted from the robot control apparatus 10 with the current value (a second current value) of each axis motor calculated by the simulation of step S5, and calculates a correction coefficient of the current value of each axis motor for allowing the second current value to coincide with the first current value. The correction coefficient, for example, can be calculated by the following least squares method.

$$e(t) = \int_{t=0}^{t} [(r(t) - \alpha s(t) - \beta)^2] dt \quad (I)$$

In Equation (I) above, e(t) denotes an error, r(t) denotes a current value obtained from the robot 1, s(t) denotes a current value calculated by simulation, α and β denote correction coefficients, and t denotes a time. In step S51, the correction coefficients α and β are calculated so that the error e(t) is minimized.

Next, in step S52, the current value is corrected using the correction coefficients α and β and the simulation is repeated and the program modification unit 22 modifies the operation program PR in step S6. In this case, when the simulation is repeated, it is not necessary to read the current value of the motor from the robot control apparatus 10 again. Therefore, even though the current value of the motor changes during the operation of the robot 1, it is possible to stably modify the operation program PR. In other words, it is possible to modify the operation program PR easily and accurately without stopping the operation of the robot 1.

Figure 10:
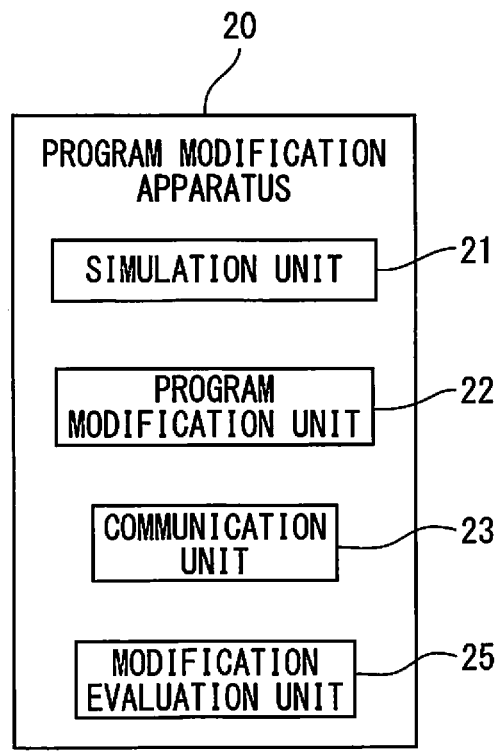
FIG. 10 is a block diagram illustrating a further example of variation of the program modification apparatus of FIG. 2.
Figure 11:
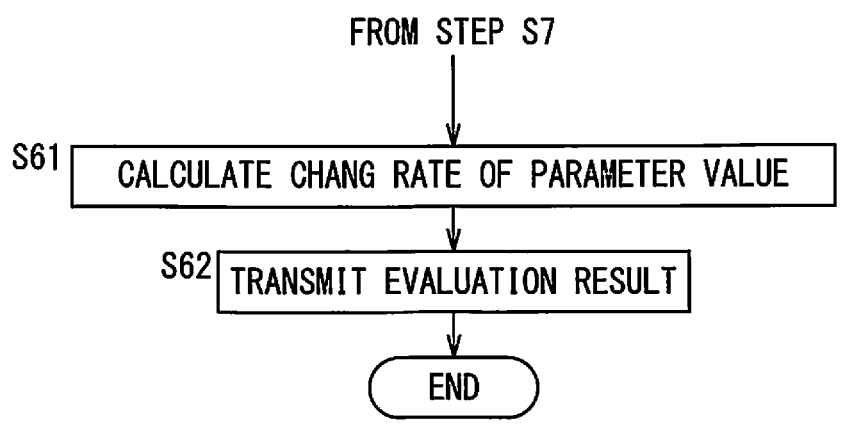
FIG. 11 is a flowchart illustrating one example of a procedure performed in the program modification apparatus of FIG. 10.

FIG. 10 is a diagram illustrating a further variation of the program modification apparatus 20, and FIG. 11 is a flowchart illustrating one example of a procedure performed in the program modification apparatus 20. FIG. 11 mainly illustrates differences with FIG. 3. The program modification apparatus 20 of FIG. 10 further has a modification evaluation unit 25 which performs simulation on the basis of the modified operation program PR1 and evaluates the effectiveness of the operation program PR. The program modification apparatus 20 transmits a result of the evaluation by the modification evaluation unit 25 to the robot control apparatus 10 via the communication unit 23.

A process of step S61 of FIG. 11, for example, is performed after the process of step S7 of FIG. 3. In step S61, the degree of a change in the values of evaluation basis parameters, such as the cycle time of the operation program PR, a load of each axis motor, the degree of overheat, a motor current, a life of a speed reducer, and power consumption, before and after the modification of the operation program PR is calculated. For example, a change rate of the parameter values after the program modification with respect to the parameter values before the program modification is calculated. By adopting this configuration, it is possible to evaluate the effectiveness of the modified operation program PR1. In step S62, a result (the change rate of the parameter values) of the evaluation by the modification evaluation unit 25 is transmitted to the robot control apparatus 10 via the communication unit 23.

Figure 12:
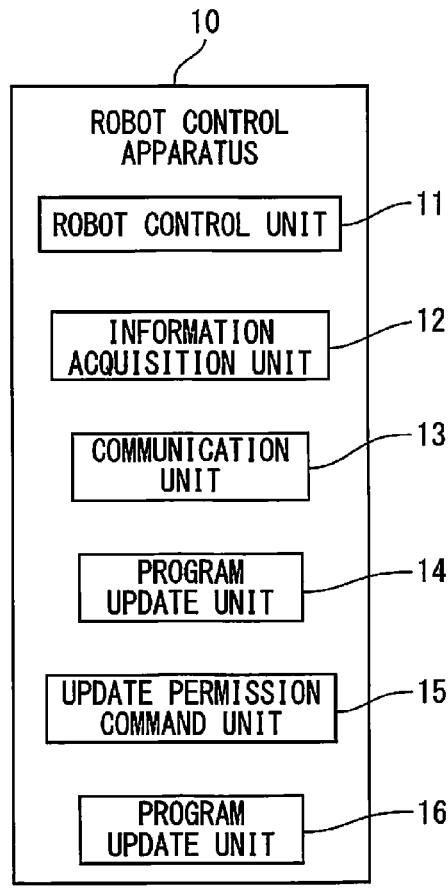
FIG. 12 is a block diagram illustrating an example of variation of the robot control apparatus of FIG. 2.
Figure 13:
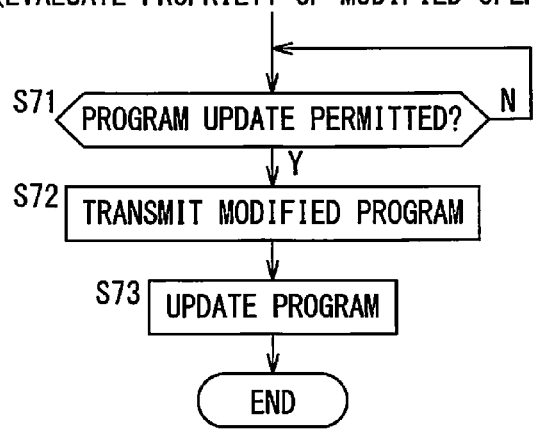
FIG. 13 is a flowchart illustrating one example of a procedure performed in the robot control apparatus of FIG. 12.

FIG. 12 is a block diagram illustrating an example of variation of the robot control apparatus 10 and, FIG. 13 is a flowchart illustrating one example of a procedure performed in the robot control apparatus 10. FIG. 13 mainly illustrates differences with FIG. 3. The robot control apparatus 10 of FIG. 12 further has an update permission command unit 15 which commands the permission or prohibition of the update of the operation program PR, and a program update unit 16 which updates the operation program PR to the modified operation program PR1 transmitted from the program modification apparatus 20 via the communication unit 23 when the update of the operation program PR is permitted by the update permission command unit 15.

A process of step S71 of FIG. 13, for example, is performed after the evaluation of the propriety of the modified operation program PR1 in step S7 of FIG. 3. In step S71, the program update unit 16 of the robot control apparatus 10 judges if the update of the operation program PR is permitted or not, i.e., if program update permission is commanded by the update permission command unit 15 or not. When step S71 is positive, the procedure proceeds to step S72 and the modified operation program is transmitted to the robot control apparatus 10 via the communication unit. In step S73, the program update unit 16 updates the operation program to the modified operation program.

In FIG. 13, it is judged if the update of the operation program PR is permitted or not, and the operation program PR is updated when the update is permitted. However, this judgment may be omitted and the program update unit 16 may update the operation program PR. The procedure of FIG. 13 may also be performed after the process of step S62 of FIG. 11. In other words, after the result of the evaluation by the modification evaluation unit 25 is transmitted, the robot control apparatus 10 may judge if program update is permitted or not.

In addition, the configuration of the information acquisition unit 12 is not limited if the operation program PR including the command speed and the command acceleration at the teaching point of the robot 1 is executed and the information acquisition unit 12 acquires the robot detection information including the speed and the current value of the motor from the robot 1. Furthermore, the configuration of the communication unit 13 (the first communication unit), which transmits the robot detection information acquired in the information acquisition unit 12 to the program modification apparatus 20, is also not limited. Consequently, the configuration of the robot control apparatus 10 having the information acquisition unit and the first transmission unit is not limited to the aforementioned configuration.

The configuration of the simulation unit 21 is not limited if the simulation unit 21 can perform simulation on the basis of the operation program PR. The configuration of the program modification unit 22 is also not limited if the program modification unit 22 modifies the operation program PR on the basis of the robot detection information transmitted by the communication unit 13 so that a result of simulation satisfies an evaluation basis decided in advance while the simulation is repeated by the simulation unit 21. The configuration of the communication unit 23 (the second communication unit) is also not limited if the communication unit 23 transmits the modified operation program PR1 modified by the program modification unit 22 to the robot control apparatus 10. Consequently, the program modification apparatus 20 having the simulation unit, the program modification unit, and the second transmission unit is not limited to the aforementioned configuration.

According to the present invention, the program modification apparatus performs simulation on the basis of the operation program and modifies the operation program by using the robot detection information acquired in the robot control apparatus so that an evaluation parameter decided in advance satisfies a predetermined evaluation basis, and therefore it is possible to accurately modify the operation program.

The above description is merely an example, and the present invention is not limited to the aforementioned embodiments and variations as long as they do not impair the features of the present invention. Elements of the embodiments and the variations include elements which can be replaced and are apparently replaced while maintaining the identification of the present invention. In other words, other embodiments considered within the technical scope of the present invention are included in the scope of the present invention. Furthermore, the embodiments and one or more of the variations can also be arbitrarily combined.

The invention claimed is:

1. A robot program modification system, comprising:
 a robot control apparatus which controls a motor for driving a robot; and
 a program modification apparatus communicating with the robot control apparatus, wherein
 the robot control apparatus comprises:
  an information acquisition unit configured to
   execute an operation program including a command speed and a command acceleration at a teaching point of the robot, and
   acquire robot detection information including a speed and a current value of a current of the motor from the robot; and
  a first communication unit configured to transmit the robot detection information acquired by the information acquisition unit to the program modification apparatus, and
 the program modification apparatus comprises:

a simulation unit configured to perform a simulation of an operation of the robot on the basis of the operation program;

a correction unit configured to, on the basis of the current value included in the robot detection information transmitted by the first communication unit, correct a current value of the current of the motor calculated by the simulation unit to obtain a corrected current value;

a program modification unit configured to modify the operation program on the basis of the robot detection information transmitted by the first communication unit and the corrected current value obtained by the correction unit so that a result of the simulation satisfies an evaluation basis decided in advance while the simulation unit repeatedly performs the simulation; and a second communication unit configured to transmit a modified operation program modified by the program modification unit to the robot control apparatus, wherein the correction unit is configured to
obtain at least one correction coefficient, and
use the obtained at least one correction coefficient to correct the current value of the current of the motor calculated by the simulation unit when the simulation is repeated, without further acquiring the current value of the current of the motor from the robot control apparatus.

2. The robot program modification system according to claim 1, wherein the simulation unit is configured to perform the simulation on the basis of the operation program under a condition that the speed and the current value of the motor included in the robot detection information transmitted by the first communication unit are within a permissible value decided in advance.

3. The robot program modification system according to claim 1, wherein
the program modification apparatus further comprises a modification evaluation unit configured to
perform a simulation of the operation of the robot on the basis of the modified operation program, and
evaluate effectiveness of the modified operation program from a result of the simulation on the basis of the modified operation program, and
the second communication unit is configured to transmit a result of the evaluation by the modification evaluation unit to the robot control apparatus.

4. The robot program modification system according to claim 1, wherein
the robot control apparatus further comprises:
an update permission command unit configured to command permission or prohibition of update of the operation program; and
a program update unit configured to update the operation program by the modified operation program transmitted from the second communication unit when the update of the operation program is permitted by the update permission command unit.

5. The robot program modification system according to claim 1, wherein the program modification unit is configured to modify the operation program so that a cycle time of the operation program becomes shortest.

6. The robot program modification system according to claim 1, wherein
the program modification apparatus is configured to acquire the operation program from the robot control apparatus via the first communication unit and the second communication unit, and
the simulation unit is configured to perform the simulation on the basis of the acquired operation program.

* * * * *